(12) United States Patent
Sadamasa et al.

(10) Patent No.: US 11,625,531 B2
(45) Date of Patent: Apr. 11, 2023

(54) INFORMATION PROCESSING APPARATUS, INFORMATION PROCESSING METHOD, AND COMPUTER-READABLE RECORDING MEDIUM

(71) Applicant: NEC CORPORATION, Tokyo (JP)

(72) Inventors: Kunihiko Sadamasa, Tokyo (JP); Yuzuru Okajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 263 days.

(21) Appl. No.: 16/961,079

(22) PCT Filed: Feb. 6, 2019

(86) PCT No.: PCT/JP2019/004305
§ 371 (c)(1),
(2) Date: Jul. 9, 2020

(87) PCT Pub. No.: WO2019/156131
PCT Pub. Date: Aug. 15, 2019

(65) Prior Publication Data
US 2021/0064825 A1 Mar. 4, 2021

(30) Foreign Application Priority Data
Feb. 7, 2018 (JP) .............................. JP2018-020258

(51) Int. Cl.
*G06F 40/279* (2020.01)
*G06F 40/20* (2020.01)
(Continued)

(52) U.S. Cl.
CPC .......... *G06F 40/20* (2020.01); *G06F 16/2455* (2019.01); *G06F 40/279* (2020.01);
(Continued)

(58) Field of Classification Search
CPC .... G06F 40/20; G06F 16/2455; G06F 40/279; G06F 40/30; G06N 20/00; G06N 5/04;
(Continued)

(56) References Cited

U.S. PATENT DOCUMENTS 5,960,384 A * 9/1999 Brash .................... G06F 40/205
704/235
6,789,054 B1 * 9/2004 Makhlouf ................. G06F 8/10
703/22
(Continued)

FOREIGN PATENT DOCUMENTS

| JP | 06-095884 A | 4/1994 |
|---|---|---|
| JP | 07-028630 A | 1/1995 |
| JP | 08-115218 A | 5/1996 |

OTHER PUBLICATIONS

Zo et al.,"A Scientific Inquiry fusion theory for high-level information fusion", Jul. 1, 2014, IEEE, 17th International Conference on Information Fusion (Fusion), pp. 1-8 (Year: 2014).*
(Continued)

*Primary Examiner* — Vijay B Chawan
(74) *Attorney, Agent, or Firm* — Sughrue Mion, PLLC

(57) ABSTRACT

An information processing apparatus 10 includes an acceptance unit 12, a formal language generation unit 14, an inference unit 16, and an update unit 18. The formal language generation unit 14 generates training expressions in a formal language based on parameters prepared in advance and pieces of text accepted by the acceptance unit 12. The inference unit 16 executes at least one inference out of deductive inference and abduction on the above training expressions using a knowledge base prepared in advance. The update unit 18 compares an inference result of the inference unit 16 with a model answer input in advance, and updates parameters such that an inference result that
(Continued)

matches the model answer is likely to be obtained through inference performed by the inference unit 16.

18 Claims, 12 Drawing Sheets

(51) Int. Cl.
*G06N 20/00* (2019.01)
*G06F 16/2455* (2019.01)
*G06F 40/30* (2020.01)
*G06N 5/04* (2023.01)

(52) U.S. Cl.
CPC .............. *G06F 40/30* (2020.01); *G06N 5/04* (2013.01); *G06N 20/00* (2019.01)

(58) Field of Classification Search
CPC .......... G06N 5/048; G06N 7/02; G06N 5/025; G06N 3/0454; G05B 19/41865; A61B 5/00; G09B 7/02; G09B 7/12
See application file for complete search history.

(56) References Cited

U.S. PATENT DOCUMENTS

| | | | | |
|---|---|---|---|---|
| 6,879,967 | B1* | 4/2005 | Stork | G06N 5/025 706/45 |
| 7,941,438 | B2* | 5/2011 | Molina-Moreno | G06F 8/35 717/109 |
| 8,401,837 | B2* | 3/2013 | Coen | G06F 21/56 704/3 |
| 8,706,477 | B1* | 4/2014 | Diaconescu | G06F 9/454 704/4 |
| 9,311,388 | B2* | 4/2016 | Gupta | G06F 16/334 |
| 11,250,841 | B2* | 2/2022 | Roux | G06N 5/04 |
| 2007/0203863 | A1* | 8/2007 | Gupta | G06N 3/0454 706/20 |
| 2011/0125484 | A1* | 5/2011 | Coen | G06F 21/56 704/3 |
| 2011/0320187 | A1* | 12/2011 | Motik | G06F 16/3344 704/9 |
| 2012/0254143 | A1* | 10/2012 | Varma | G06F 40/30 707/706 |
| 2013/0288219 | A1* | 10/2013 | Dheap | G09B 7/12 434/350 |
| 2013/0318012 | A1* | 11/2013 | Huang | G06N 7/02 706/12 |
| 2014/0006012 | A1* | 1/2014 | Zhou | G06F 16/3344 704/9 |
| 2014/0195466 | A1* | 7/2014 | Phillipps | G06F 16/00 706/12 |
| 2014/0258286 | A1* | 9/2014 | Brown | G06F 16/334 707/728 |
| 2014/0272909 | A1* | 9/2014 | Isensee | G09B 7/02 434/362 |
| 2014/0358964 | A1* | 12/2014 | Woods | G06F 16/3329 707/769 |
| 2015/0100943 | A1* | 4/2015 | Gabel | G06F 40/20 717/106 |
| 2016/0140123 | A1* | 5/2016 | Chang | G06F 16/24522 707/760 |
| 2017/0032262 | A1* | 2/2017 | Gerken | G06N 5/048 |
| 2017/0075891 | A1* | 3/2017 | Bozkaya | G06F 16/3329 |
| 2017/0140290 | A1* | 5/2017 | Block | G06N 5/048 |
| 2017/0154043 | A1* | 6/2017 | Brown | G06F 16/90335 |
| 2017/0278000 | A1* | 9/2017 | Kohlhepp | G05B 19/41865 |
| 2017/0364587 | A1* | 12/2017 | Krishnamurthy | G06F 16/345 |
| 2017/0371861 | A1* | 12/2017 | Barborak | G06F 16/22 |
| 2018/0025075 | A1* | 1/2018 | Beller | G06F 16/3329 707/769 |
| 2018/0033325 | A1* | 2/2018 | Byron | G06F 40/284 |

OTHER PUBLICATIONS

Moldovan et al., "Role of Semantics in Question Answering", 2010, IEEE, Semantic Computing, pp. 373-419 (Year: 2010).*

Dhamdhere et al, "Abductive Matching in Question Answering", Sep. 10, 2017, Cornell University, Google Research, pp. 1-9 (Year: 2017).*

Percy Liang et al., "Learning Dependency-Based Compositional Semantics", Proceedings of the 49th Annual Meeting of the Association for Computational Linguistics, Jun. 19-24, 2011, pp. 590-599.

International Search Report for PCT/JP2019/004305, dated May 14, 2019.

International Preliminary Report on Patentability dated Aug. 11, 2020 from the International Bureau in International Application No. PCT/JP2019/004305.

* cited by examiner

Fig.3

| FEATURE | | WEIGHT |
|---|---|---|
| SURFACE LAYER WORD | DEEP LAYER WORD | |
| father | grandfather/2 | -100 |
| father | taro | -100 |
| father | ichiro | -100 |
| father | jiro | -100 |
| father | father | -2 |
| father | father/2 | -2 |
| loss | loss | -2 |
| loss | loss/1 | -2 |
| loss | loss/2 | -2 |
| loss | decrease | -100 |
| loss | decrease/1 | -100 |
| loss | decrease/2 | -100 |
| emotion | emotion | -2 |
| emotion | emotion/2 | -2 |
| ... | ... | ... |
| ... | ... | ... |

Fig.5A

| EXPRESSION | PROBABILITY |
|---|---|
| father(Ichiro, Taro) | 0.80 |
| grandfather(Ichiro, Taro) | 0.17 |
| father(Taro, ichiro) | 0.03 |

Fig.5B

| EXPRESSION | PROBABILITY |
|---|---|
| father(Jiro, Ichiro) | 0.78 |
| grandfather(Jiro, Ichiro) | 0.18 |
| father(Ichiro, Jiro) | 0.04 |

Fig.6

① { father(Ichiro, Taro)
    father(Jiro, Ichiro) }

② { father(Ichiro, Taro)
    grandfather(Jiro, Ichiro) }

③ { father(Ichiro, Taro)
    father(Ichiro, Jiro) }

④ { grandfather(Ichiro, Taro)
    father(Jiro, Ichiro) }

⑤ { grandfather(Ichiro, Taro)
    grandfather(Jiro, Ichiro) }

⑥ { grandfather(Ichiro, Taro)
    father(Ichiro, Jiro) }

⑦ { father(Taro, Ichiro)
    father(Jiro, Ichiro) }

⑧ { father(Taro, Ichiro)
    grandfather(Jiro, Ichiro) }

⑨ { father(Taro, Ichiro)
    father(Ichiro, Jiro) }

INFORMATION PROCESSING APPARATUS, INFORMATION PROCESSING METHOD, AND COMPUTER-READABLE RECORDING MEDIUM

CROSS REFERENCE TO RELATED APPLICATIONS

This application is a National Stage of International Application No. PCT/JP2019/004305 filed Feb. 6, 2019, claiming priority based on Japanese Patent Application No. 2018-020258 filed Feb. 7, 2018, the disclosure of which is incorporated herein in its entirety by reference.

TECHNICAL FIELD

The present invention relates to an information processing apparatus and an information processing method for optimizing parameters that are used when text in a natural language is converted into an expression in a formal language, as well as a computer-readable recording medium in which a program for optimizing parameters that are used when text in a natural language is converted into an expression in a formal language is recorded.

BACKGROUND ART

In recent years, it has become possible to acquire large-scale knowledge bases via the Internet, and research on systems for performing question-answering using a knowledge base is advancing. A knowledge base that is used in such a system commonly has a structure in which knowledge corresponding to a query written in a formal language can be extracted. For example, Resource Description Framework (RDF) is used as a formal language.

Even when a question answering system that uses such a knowledge base, to which an inquiry can be made in a formal language, is used, a user's question is commonly expressed in a natural language. Therefore, in order to extract a piece of knowledge corresponding to the user's question from the knowledge base, the user's question expressed in a natural language needs to be converted into a formal language.

In view of this, conventionally, semantic parsers are used to convert a natural language into a formal language. Commonly, question answering systems that use a knowledge base convert a user's question expressed in a natural language into a query expression written in a formal language using a semantic parser, extract, from the knowledge base, an answer corresponding to the query expression obtained by the conversion, and present the answer to the user.

Incidentally, in order to extract an appropriate answer to a user's question from a knowledge base, there is a need to properly understand the semantic structure of the user's question, and convert the question in a natural language into a query expression suitable for the knowledge base. However, expressions in a natural language vary greatly, and thus it is difficult to manually construct rules for appropriately converting a user's question in the natural language into a query expression.

In view of this, techniques for automatically constructing a semantic parser suitable for any knowledge base using machine learning have been proposed (for example, see Non-patent Document 1).

In the technique described in Non-patent Document 1, questions in a natural language and correct answers to the questions are prepared in advance, and the questions in the natural language prepared in advance are converted into a plurality of query expressions by a semantic parser. Specifically, the semantic parser converts (the questions in) the natural language into query expressions written in a formal language based on parameters set in advance. In addition, in the technique described in Non-patent Document 1, answers respectively corresponding to a plurality of query expressions and generated by the semantic parser are extracted from the knowledge base, and the plurality of extracted answers are compared with the above correct answers prepared in advance. Then, the above-mentioned parameters are updated based on the result of the comparison between the plurality of extracted answers and the correct answers prepared in advance so as to obtain a correct answer to a user's question.

LIST OF RELATED ART DOCUMENTS

Non-Patent Document

Non-patent Document 1: Percy Liang, Michael Jordan, and Dan Klein. 2011. Learning dependency-based compositional semantics. In Proceedings of the Human Language Technology Conference of the Association for Computational Linguistics, pages 590-599, Portland, Oreg.

SUMMARY OF INVENTION

Problems to be Solved by the Invention

Incidentally, the technique in Non-patent Document 1 is considered to be useful for a system that presents an answer determined unambiguously for a question input by the user. However, in a system that presents an inference result that is based on a natural language input by the user, it is difficult to present an appropriate inference result simply by using the technique of Non-patent Document 1 alone.

An example object of the invention is to provide an information processing apparatus, an information processing method, and a computer-readable recording medium that can optimize parameters that are used when a natural language is converted into a formal language in a system that performs inference that is based on a natural language input by the user.

In order to achieve the foregoing object, an information processing apparatus according to an example aspect of the invention includes:

an acceptance circuit configured to accept at least one of texts written in a natural language and at least one of labels written in a formal language for the texts;

a formal language generation circuit configured to generate at least one of queries written in the formal language for the texts by using a pre-trained machine learning model and the texts;

an inference circuit configured to automatically infer at least one of inference results written in the formal language by applying at least one of deductive inference method and abduction method to the queries and a knowledge base; and an update circuit configured to update the model such that the at least one of inference results that matches the labels is likely to be obtained through the inference that is performed by the inference circuit.

In addition, in order to achieve the foregoing object, an information processing method according to an example aspect of the invention includes;

accepting at least one of texts written in a natural language and at least one of labels written in a formal language for the texts;

at least one of queries written in the formal language for the texts by using a pre-trained machine learning model and the texts;

automatically inferring at least one of inference results written in the formal language by applying at least one of deductive inference method and abduction method to the queries and a knowledge base; and automatically updating the model such that the at least one of inference results that matches the labels is likely to be obtained through the automatically inferring.

Furthermore, in order to achieve the foregoing object, a non-transitory computer-readable recording medium according to an example aspect of the invention includes a program recorded thereon, the program including instructions that cause a computer to carry out:

accepting at least one of texts written in a natural language and at least one of labels written in a formal language for the texts;

generating at least one of queries written in the formal language for the texts by using a pre-trained machine learning model and the texts;

executing automatically inferring at least one of inference results written in the formal language by applying at least one of deductive inference method and abduction method to the queries and a knowledge base; and automatically updating the model such that the at least one of inference results that matches the labels is likely to be obtained through the automatically inferring.

Advantageous Effects of the Invention

As described above, according to the invention, it is possible to optimize parameters that are used when a natural language is converted into a formal language in a system that performs inference that is based on a natural language input by the user.

BRIEF DESCRIPTION OF THE DRAWINGS

FIG. 3 is a diagram showing an example of features set in advance.

FIG. 5A is a diagram showing examples of training expressions and generation probabilities thereof.

FIG. 5B is a diagram showing examples of training expressions and generation probabilities thereof.

FIG. 6 is a diagram showing an example of combinations of training expressions for which inference is executed.

EXAMPLE EMBODIMENTS

Example Embodiment

Hereinafter, an information processing apparatus, an information processing method and a program according to an example embodiment of the invention is described, with reference to FIGS. 1 to 10.

Apparatus Configuration

Figure 1:
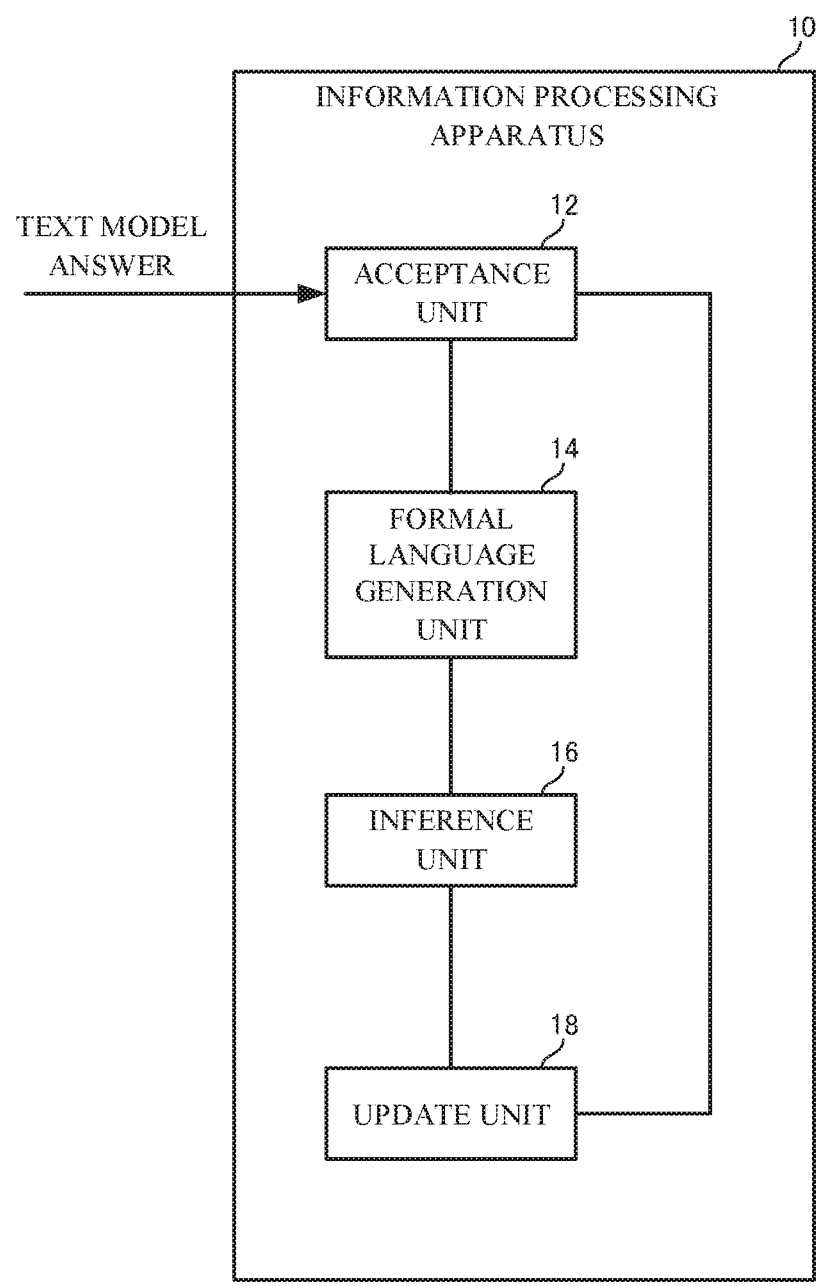
FIG. 1 is a block diagram showing an information processing apparatus according to an example embodiment of the invention.

FIG. 1 is a block diagram showing an information processing apparatus 10 according to the example embodiment. The information processing apparatus 10 in the example embodiment is an apparatus for optimizing parameters that are used when one or more pieces of text in a natural language are converted into one or more expressions written in a formal language.

The information processing apparatus 10 includes an acceptance unit 12 (e.g., an acceptance circuit), a formal language generation unit 14 (e.g., a formal language generation circuit), an inference unit 16 (e.g., an inference circuit), and an update unit 18 (e.g., an update circuit). One or more pieces of text written in a natural language and a model answer of an inference result obtained from the pieces of text are input to the acceptance unit 12. The acceptance unit 12 transmits the one or more accepted pieces of text to the formal language generation unit 14, and transmits the accepted model answer to the update unit 18.

The formal language generation unit 14 generates, as one or more training expressions, one or more expressions written in a formal language corresponding to the above pieces of text transmitted from the acceptance unit 12, based on parameters prepared in advance and the above one or more pieces of text. The formal language generation unit 14 transmits the one or more generated training expressions to the inference unit 16. In the example embodiment, the formal language generation unit 14 converts a piece of text in a natural language into an expression in a formal language using machine learning such as that that uses a log-linear model. Although a detailed description is omitted, the formal language generation unit 14 can be configured similarly to a known converter that converts a piece of text in a natural language input by the user into an expression in a formal language, for example. The formal language generation unit 14 can be constructed using the technique disclosed in Non-patent Document 1, for example.

The inference unit 16 executes at least one inference out of deductive inference and abduction on the one or more training expressions transmitted from the formal language generation unit 14, using a knowledge base prepared in advance. The knowledge base stores, for example, at least one relationship out of a causal relationship, a temporal before-after relationship, a semantic super-sub relationship, and an implicational relationship between the antecedent and consequent item. The inference unit 16 transmits a result obtained through the inference, to the update unit 18.

The update unit 18 compares the inference result transmitted from the inference unit 16 with the model answer transmitted from the acceptance unit 12, and updates the above-mentioned parameters such that an inference result that matches the model answer is likely to be obtained through the inference performed by the inference unit 16.

As described above, according to the example embodiment, an expression in a formal language is obtained as a result of inputting a piece of text written in a natural language to the formal language generation unit 14, and inference is executed by the inference unit 16 based on the obtained expression in the formal language. Parameters are then updated such that an inference result that matches a model answer set in advance is likely to be obtained through the above inference performed by the inference unit 16. In this manner, it is possible to optimize parameters that are used when one or more pieces of text in a natural language are converted into one or more expressions in a formal language.

Figure 2:
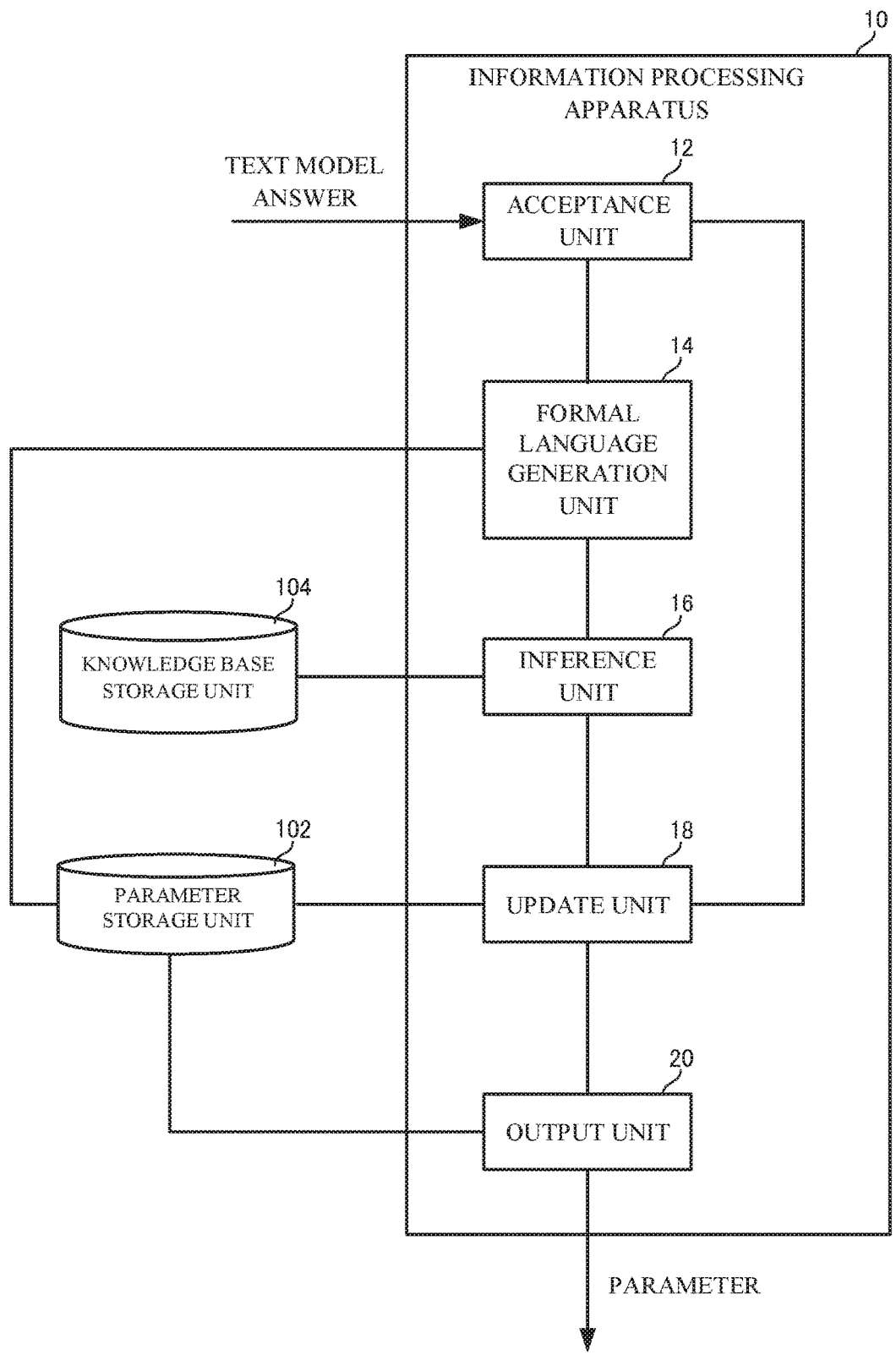
FIG. 2 is a block diagram showing a specific configuration of an information processing apparatus according to an example embodiment of the invention.

Next, a configuration of an information processing apparatus according to an example embodiment of the invention is described in more detail with reference to FIG. 2. FIG. 2 is a block diagram showing a specific configuration of an information processing apparatus according to an example embodiment of the invention. Note that a case is described below in which one or more pieces of text in a natural language are converted into a Prolog formal language, but another formal language may also be used.

As shown in FIG. 2, the information processing apparatus 10 according to the example embodiment also includes an output unit 20 in addition to the acceptance unit 12, the formal language generation unit 14, the inference unit 16, and the update unit 18, which have been described above. In addition, in the example embodiment, the information processing apparatus 10 is connected to a parameter storage unit 102 and a knowledge base storage unit 104.

As described above, one or more pieces of text written in a natural language and a model answer of an inference result obtained from the one or more pieces of text are input to the acceptance unit 12. The acceptance unit 12 transmits the one or more pieces of accepted text to the formal language generation unit 14, and transmits the accepted model answer to the update unit 18.

The formal language generation unit 14 generates, as one or more training expressions, one or more expressions written in a formal language corresponding to the above one or more pieces of text transmitted from the acceptance unit 12, based on parameters stored in the parameter storage unit 102 (to be described later) in advance and the above one or more pieces of text. The formal language generation unit 14 transmits the one or more generated training expressions to the inference unit 16.

In the example embodiment, the formal language generation unit 14 converts one or more pieces of text written in a natural language into one or more training expressions written in a formal language, for example, based on a plurality of pre-set features (characteristics) characterizing a pair of text that is input and an expression in a formal language that is output, using machine learning such as that that uses a log-linear model.

In the example embodiment, for example, a plurality of combinations of surface layer words and deep layer words as shown in FIG. 3 are set as features in advance. Note that surface layer words in the example embodiment refer to words present in text in a natural language that is input to the acceptance unit 12 and words that are present as text in a knowledge base stored in the knowledge base storage unit 104. Also, a deep layer word is a predicate corresponding to a surface layer word, and refers to a predicate included in a knowledge base stored in the knowledge base storage unit 104, and a word that is present as a piece of text in that knowledge base. In the example embodiment, for example, a predicate with an argument of 0 to 2 is set for each surface layer word. In FIG. 3, a numeral after a slash among the characters in a deep layer word is an argument. The argument in a deep layer word "grandfather/2" is 2, for example. Note that a predicate with an argument of three or higher may also be set for each surface layer word.

In addition, as shown in FIG. 3, in the example embodiment, a weight is set for each feature. In the example embodiment, a weight added to each feature is a parameter. In the state of initial settings, weights of respective combinations (features) of surface layer words and deep layer words that can be associated with each other by using a translation dictionary, a synonym dictionary, and the like are set higher, and weights of other combinations (features) are set lower. In the example embodiment, the above-described features and weights (parameters) added to the respective features are stored in the parameter storage unit 102.

Note that surface layer words and deep layer words shown in FIG. 3 are merely exemplary, and the number of features and a combination of surface layer words and deep layer words that constitute each feature are not limited to the example shown in FIG. 3.

Figure 4A:
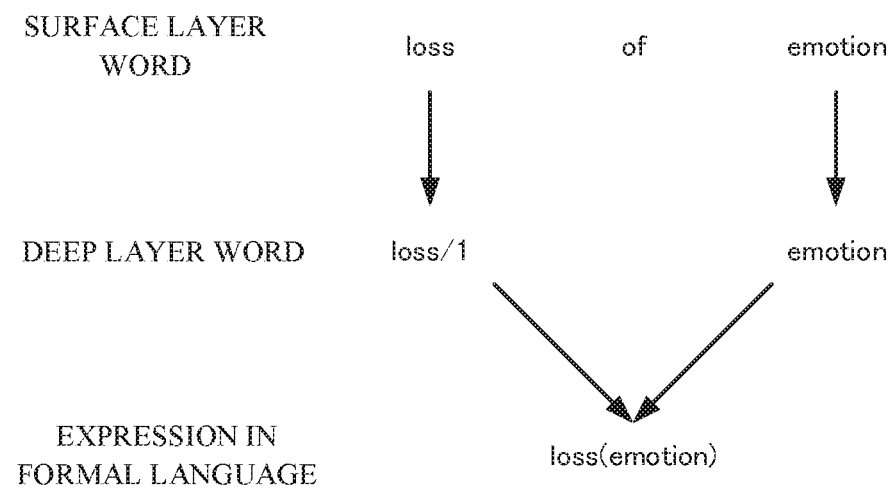
FIG. 4A is a diagram for illustrating conversion operations in a formal language generation unit.
Figure 4B:
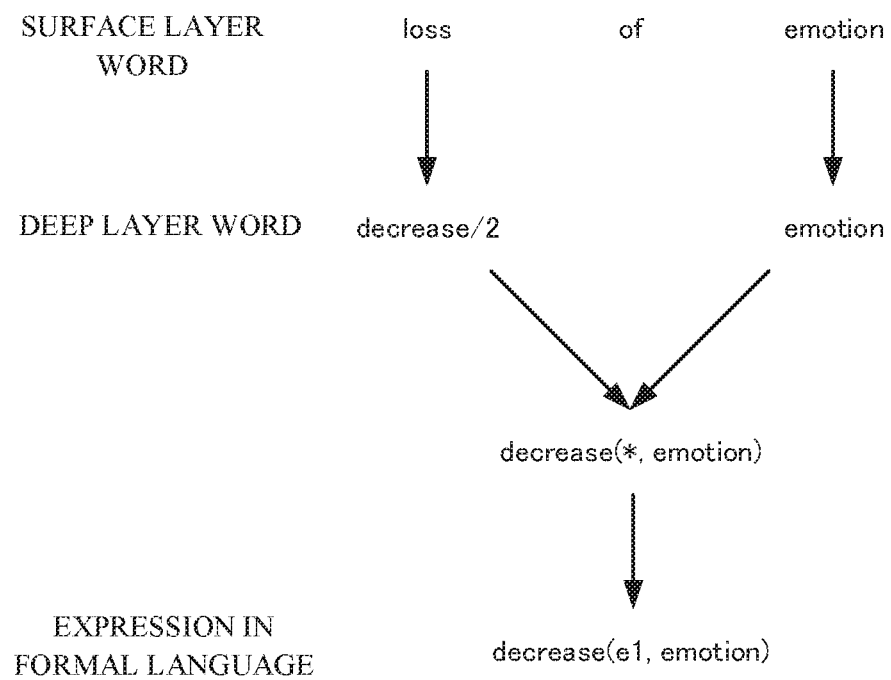
FIG. 4B is a diagram for illustrating conversion operations in a formal language generation unit.

In the example embodiment, the formal language generation unit 14 converts surface layer words into deep layer words based on features set in advance, for example, and converts a piece of text in a natural language into an expression in a formal language by substituting an argument of a deep layer word with another deep layer word. An example of a conversion operation of the formal language generation unit 14 is described briefly below. FIG. 4A and FIG. 4B are diagrams for illustrating examples of a conversion operation in the formal language generation unit 14. Note that, a case in which "loss of emotion" is input in the formal language generation unit 14 as a piece of text in a natural language is described with reference to FIG. 4A and FIG. 4B.

As shown in FIG. 4A, when "loss of emotion" is input, the formal language generation unit 14 converts the surface layer word "loss" into a deep layer word "loss/1", and converts the surface layer word "emotion" into a deep layer word "emotion" based on features set in advance, for example. Then, as a result of the argument of the deep layer word "loss/1" being substituted with "emotion" that is an atom (predicate that includes no argument), a training expression "loss (emotion)" written in a formal language is generated. Also, as shown in FIG. 4B, the formal language generation unit 14 converts the surface layer word "loss" into a deep layer word "decrease/2", and converts the surface layer word "emotion" into a deep layer word "emotion", for example. The argument in the deep layer word "decrease/2" is then substituted with an atom, and a blank argument is further substituted with an atom indicating an entry (in the example embodiment, "e1"), and, as a result, a training expression "decrease (e1,emotion)" written in the formal language is generated. Note that, in the example shown in FIG. 4A and FIG. 4B, the functional word "of" is converted into "null" indicating that there is no corresponding deep layer word, by the formal language generation unit 14, and conversion of the functional word "of" into a formal language can be omitted. Note that the formal language in FIG. 4A and FIG. 4B is exemplary, and the formal language generation unit 14 generates a plurality of training expressions based on features set in advance.

In the example embodiment, as shown in FIG. 5A and FIG. 5B, the formal language generation unit 14 calculates a probability that each training expression to be output is obtained (hereinafter, also referred to as "generation probability of each training expression"), based on the weights of the features (parameters) set as described above. Note that FIG. 5A shows an example of training expressions generated when "Ichiro is Taro's father." is input to the formal language generation unit 14 as a piece of text in a natural language and generation probabilities of the training expressions, and FIG. 5B shows an example of training expressions generated when "Jiro is Ichiro's father." is input to the formal language generation unit 14 as a piece of text in a natural language and the generation probabilities of the training expressions. The formal language generation unit 14 transmits each training expression and the generation probability of the training expression obtained through calculation, to the inference unit 16. Note that, as described above, for example, the technique disclosed in Non-patent Document 1 can be used for the formal language generation unit 14, and thus a detailed description of the formal language generation unit 14 is omitted.

Although a detailed description is omitted, in the example embodiment, for example, a configuration may also be adopted in which, when converting surface layer words into deep layer words, the formal language generation unit 14 selects features that have a weight of a predetermined threshold value or higher, and performs conversion. The formal language generation unit 14 may also transmit, for example, only a predetermined number of training expressions selected in the order of highest generation probability, from among a plurality of generated training expressions, to the inference unit 16 along with the probabilities of the training expressions. The formal language generation unit 14 may also output, for example, a predetermined number of randomly sampled training expressions, from among a plurality of generated training expressions, to the inference unit 16.

The inference unit 16 executes at least one inference out of deductive inference and abduction, on one or more training expressions transmitted from the formal language generation unit 14, using the knowledge base stored in the knowledge base storage unit 104.

In the example embodiment, when a plurality of training expressions are generated for each piece of text by the formal language generation unit 14, the inference unit 16 executes inference on all of the combinations of training expressions generated from different pieces of text, for example. In the example in FIG. 5A and FIG. 5B, for example, the formal language generation unit 14 generates three training expressions from the text "Ichiro is Taro's father", and three training expressions from the text "Jiro is Ichiro's father". In this case, the inference unit 16 executes inference on nine combinations of training expressions as shown in FIG. 6.

Note that the inference unit 16 may execute inference on a predetermined number of combinations of training expressions randomly sampled from among all of the combinations of the training expressions generated from different pieces of text. In addition, the inference unit 16 may also execute inference on a predetermined number of combinations of training expressions sampled based on parameters when training expressions are generated, from among all of the combinations of the training expressions generated from different pieces of text.

The inference unit 16 transmits a result obtained by inference, to the update unit 18. The update unit 18 compares the inference result transmitted from the inference unit 16 with a model answer transmitted from the acceptance unit 12, and updates parameters stored in the parameter storage unit 102 such that an inference result that matches the model answer is likely to be obtained through inference performed by the inference unit 16. A description thereof is given below with an example.

Assume that, for example, the expression "grandfather (Jiro, Taro)" written in a formal language has been input to the acceptance unit 12 as a model answer. Also, assume that a plurality of rules are stored in a knowledge base, and the rules include "father (a, b)^ father (b, c)->grandfather (a, c)".

Under the above conditions, when inference is executed on the nine combinations shown in FIG. 6, the inference unit 16 can obtain "grandfather (Jiro, Taro)" as an inference result, from a first combination (combination of "father (Ichiro, Taro)" and "father (Jiro, Ichiro)") in FIG. 6. In this case, the inference result transmitted from the inference unit 16 to the update unit 18 and a model answer transmitted from the acceptance unit 12 to the update unit 18 match. Therefore, the update unit 18 updates parameters (in the example embodiment, the weights of features) stored in the parameter storage unit 102 such that a combination of training expressions from which the inference result "grandfather (Jiro, Taro)" that matches the model answer can be obtained is likely to be generated by the formal language generation unit 14. Specifically, in the formal language generation unit 14, parameters stored in the parameter storage unit 102 are updated such that the text "Ichiro is Taro's father." is likely to be converted into the training expression "father (Ichiro, Taro)", and the text "Jiro is Ichiro's father" is likely to be converted into the training expression "father (Jiro, Ichiro)". For example, the update unit 18 may also update parameters such that the weights of features based on which the text "Ichiro is Taro's father" is converted into the training expression "father (Ichiro, Taro)" and the weights of features based on which the text "Jiro is Ichiro's father." is converted into the training expression "father (Jiro, Ichiro)" are increased. In addition, for example, the update unit 18 may also update parameters such that the weights of features that do not contribute to conversion from the text "Ichiro is Taro's father" into the training expression "father (Ichiro, Taro)" and the weights of features that do not contribute to conversion from the text "Jiro is Ichiro's father" into the training expression "father (Jiro, Ichiro)" are reduced. In other words, when one or more training expressions from which an inference result that matches a model answer can be obtained are set as correct expressions, the update unit 18 may update parameters such that the weights of features based on which a piece of text in a natural language is converted into a correct expression are increased, or may also update parameters such that the weights of features that do not contribute to conversion from a piece of text in a natural language into a correct expression are reduced. Note that, although a detailed description is omitted, an algorithm described in Non-patent Document 1 can be used for updating of parameters that is performed by the update unit 18, for example.

The output unit 20 outputs parameters updated by the update unit 18. The parameters output from the output unit 20 and updated parameters stored in the parameter storage unit 102 can also be used in an apparatus other than the information processing apparatus 10 (for example, a known converter). In the example embodiment, the output unit 20 outputs parameters stored in the parameter storage unit 102, when the number of updates performed by the update unit 18 reaches a designated number set in advance, for example.

Note that a case has been described above in which one model answer is input to the acceptance unit 12, but a plurality of model answers may also be input to the acceptance unit 12. In this case, there is a possibility that a plurality of inference results that match the plurality of model answers is obtained through inference performed by the inference unit 16. In this case, the update unit 18 may update parameters stored in the parameter storage unit 102 such that a plurality of training expressions corresponding to a plurality of inference results that match a plurality of model answers are likely to be generated by the formal language generation unit 14, for example. Note that inference results that match all of a plurality of model answers do not need to be obtained through inference performed by the inference unit 16. That is to say, it suffices for an inference result that matches one of the plurality of model answers to be obtained by the inference unit 16. In this case, the update unit 18 may update parameters stored in the parameter storage unit 102 such that a training expression corresponding to an inference result that matches one of a plurality of model answers is likely to be generated by the formal language generation unit 14, for example.

In addition, one piece of text or three or more pieces of text may also be input to the acceptance unit 12. For example, when one piece of text is input to the acceptance unit 12, a plurality of training expressions are generated by the formal language generation unit 14 based on that one piece of text. Inference is then executed on each of the plurality of training expressions, and, in response to a condition that an inference result that matches the model answer is obtained, parameters stored in the parameter storage unit 102 are updated by the update unit 18. In addition, when three or more pieces of text are input to the acceptance unit 12, one or more training expressions are generated for each piece of text by the formal language generation unit 14. In this case, for example, inference is executed on all of the combinations of training expressions generated from different pieces of text, or a combination of randomly selected training expressions, and, when an inference result that matches the model answer is obtained, parameters stored in the parameter storage unit 102 are updated by the update unit 18.

Apparatus Operations

Figure 7:
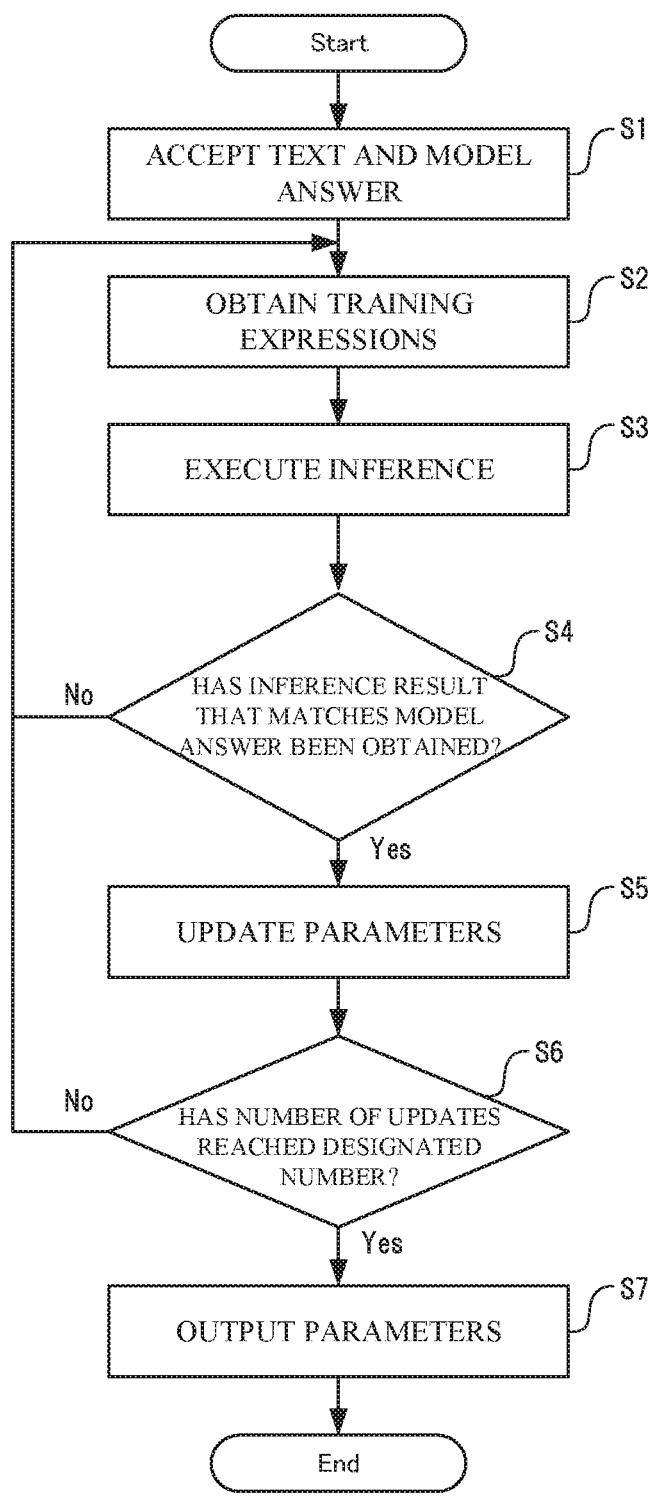
FIG. 7 is a flowchart showing operations of an information processing apparatus according to an example embodiment of the invention.

Next, operations of an information processing apparatus in an example embodiment of the invention is described with reference to FIG. 7. FIG. 7 is a flowchart showing operations of an information processing apparatus in an example embodiment of the invention. In the following description, FIGS. 1 to 6 is referred to as appropriate. In addition, in the example embodiment, as a result of causing the information processing apparatus 10 to operate, an information processing method is carried out. Thus, a description of the information processing method in the example embodiment is replaced with the following description of operations of the information processing apparatus 10.

Note that a case is described below in which the inference unit 16 executes inference on a predetermined number of training expressions randomly sampled from among one or more training expressions generated from one or more pieces of text (or a predetermined number of randomly sampled combinations of training expressions). However, the inference unit 16 may execute inference on training expressions sampled based on parameters (or a combination of training expressions sampled based on parameters), for example.

As shown in FIG. 7, in the information processing apparatus 10, first, the acceptance unit 12 accepts one or more pieces of text written in a natural language and a model answer of an inference result (step S1). Next, the formal language generation unit 14 generates one or more training expressions (expressions written in a formal language) corresponding to the one or more pieces of text accepted by the acceptance unit 12 (step S2).

Next, the inference unit 16 executes inference on one or more training expressions randomly sampled from among the one or more training expressions generated by the formal language generation unit 14 (or one or more combinations of randomly sampled training expressions), using a knowledge base stored in the knowledge base storage unit 104, and obtains one or more inference results (step S3). Next, the update unit 18 compares the one or more inference results obtained by the inference unit 16 with the model answer input to the acceptance unit 12, and determines whether or not an inference result that matches the model answer has been obtained (step S4).

If it is determined in step S4 that an inference result that matches the model answer has been obtained, the update unit 18 updates parameters stored in the parameter storage unit 102 as described above (step S5). Note that, in step S5, as described above, for example, the update unit 18 may update parameters such that the weights of features, based on which text in a natural language is converted into a correct expression, are increased, or may update parameters such that the weights of features, based on which text in a natural language is converted into a training expression different from the correct expression, are reduced. After the parameters have been updated by the update unit 18, the output unit 20 determines whether or not the number of updates performed by the update unit 18 has reached a designated number of times set in advance (step S6). If the number of updates has reached the designated number, the output unit 20 outputs parameters (step S7).

If it is determined in step S4 that an inference result that matches the model answer has not been obtained, or if it is determined in step S6 that the number of updates has not reached the designated number, the process in step S2 is executed again, and a training expression is newly generated by the formal language generation unit 14. Subsequently, the above-described processing is repeatedly executed. Note that, if it is determined in step S4 that an inference result that matches the model answer has not been obtained, the procedure may return to the process step S1.

As described above, according to the example embodiment, it is possible to optimize parameters that are used when one or more pieces of text in a natural language are converted into one or more expressions in a formal language such that an inference result that matches a model answer set in advance is likely to be obtained by the inference unit 16.

Modified Example 1

In the above example embodiment, in step S4, the update unit 18 compares an inference result obtained by the inference unit 16 with a model answer input to the acceptance unit 12, and determines whether or not an inference result that matches the model answer has been obtained. However, content of processing that is performed by the update unit 18 is not limited to the above-described example.

Figure 8:
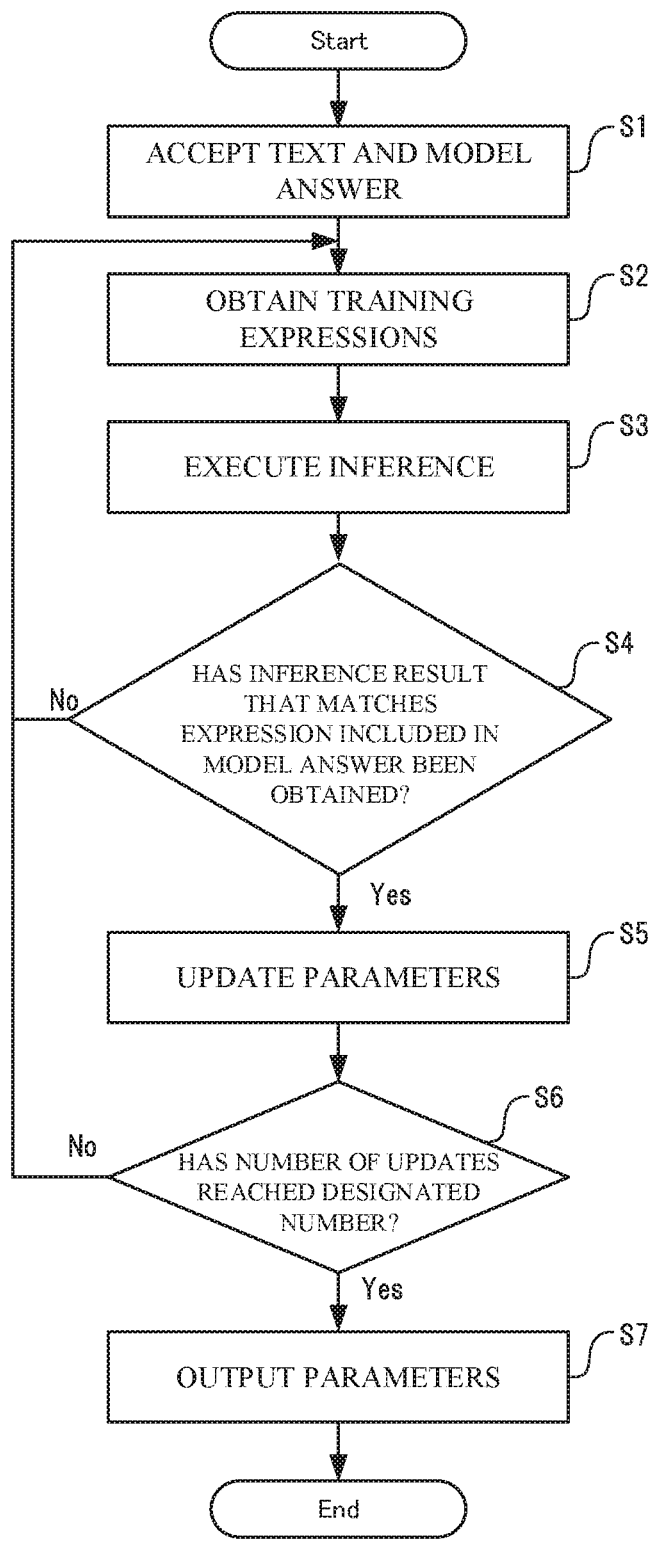
FIG. 8 is a flowchart showing operations of an information processing apparatus according to Modified Example 1 of the invention.

For example, in response to a condition that a model answer input to the acceptance unit 12 includes a plurality of expressions written in a formal language, the update unit 18 determines whether or not an inference result that matches at least one expression out of the plurality of expressions included in the model answer has been obtained through inference performed by the inference unit 16, in step S4, as shown in FIG. 8. Specifically, for example, when "father (Ichiro, Taro)^ age (Ichiro, 30)" is input to the acceptance unit 12 as a model answer, the update unit 18 determines whether or not at least one of "father (Ichiro, Taro)" and "age (Ichiro, 30)" has been obtained as an inference result through inference performed by the inference unit 16.

In step S4, if an inference result that matches at least one expression out of the plurality of expressions included in the model answer has been obtained, the update unit 18 updates parameters such that the inference result that matches at least one expression is likely to be obtained through inference performed by the inference unit 16 (step S5). Specifically, parameters stored in the parameter storage unit 102 are updated such that the training expression from which the inference result that matches at least one expression can be obtained is likely to be generated by the formal language generation unit 14.

In step S4, if an inference result that matches at least one expression out of the plurality of expressions included in the model answer has not been obtained, the process in step S2 is executed again, and training expressions are newly generated by the formal language generation unit 14. The above-described processing is then executed repeatedly. Note that the content of processes other than the process in step S4 is similar to that described with reference to FIG. 7, and thus a description thereof is omitted. In addition, if it is determined in step S4 that an inference result that matches at least one expression out of the plurality of expressions included in the model answer has not been obtained, the procedure may return to the process in step S1.

Modified Example 2

In the above example embodiment, a case has been described in which the output unit 20 determines in step S6 whether or not the number of updates performed by the update unit 18 has reached the designated number, but the process in step S6 is not limited to the above-described example. For example, a configuration may also be adopted in which, in step S6, if the above generation probability of a correct expression that is based on updated parameters is larger than the generation probability of a training expression different from the correct expression, the output unit 20 makes a determination of Yes, and if the generation probability of the correct expression is smaller than or equal to the generation probability of a training expression other than the correct expression, the output unit 20 makes a determination of No. In addition, for example, a configuration may also be adopted in which, in step S6, if the smallest value of the difference between the above generation probability of the correct expression that is based on updated parameters and the generation probability of a training expression other than the correct expression is larger than a threshold value set in advance, the output unit 20 makes a determination of Yes, and, if the above smallest value is smaller than or equal to the threshold value, makes a determination of No.

Modified Example 3

In the above example embodiment, a case has been described in which the inference unit 16 performs decisive inference in step S3, but the inference unit 16 may also perform probabilistic inference. When the inference unit 16 performs probabilistic inference, the probability that a model answer is obtained from one or more training expressions generated by the formal language generation unit 14 is calculated in step S3. Specifically, for example, as shown in FIG. 6, when inference is executed on each of the nine combinations of training expressions, a probability (score) that a model answer is obtained is calculated for each combination.

A probability that a model answer is obtained can be calculated using an MLN (Markov Logic Network), for example, with training expressions generated by the formal language generation unit 14 serving as inputs (nodes). When an MLN is used, sampling is performed such that, for example, regarding the generation probability of each training expression (probability that each training expression is obtained) described with reference to FIG. 5A and FIG. 5B, the node of the training expression is true, and the periphery probability of the node corresponding to the model answer can be calculated as a probability (score) that the model answer is obtained.

Figure 9:
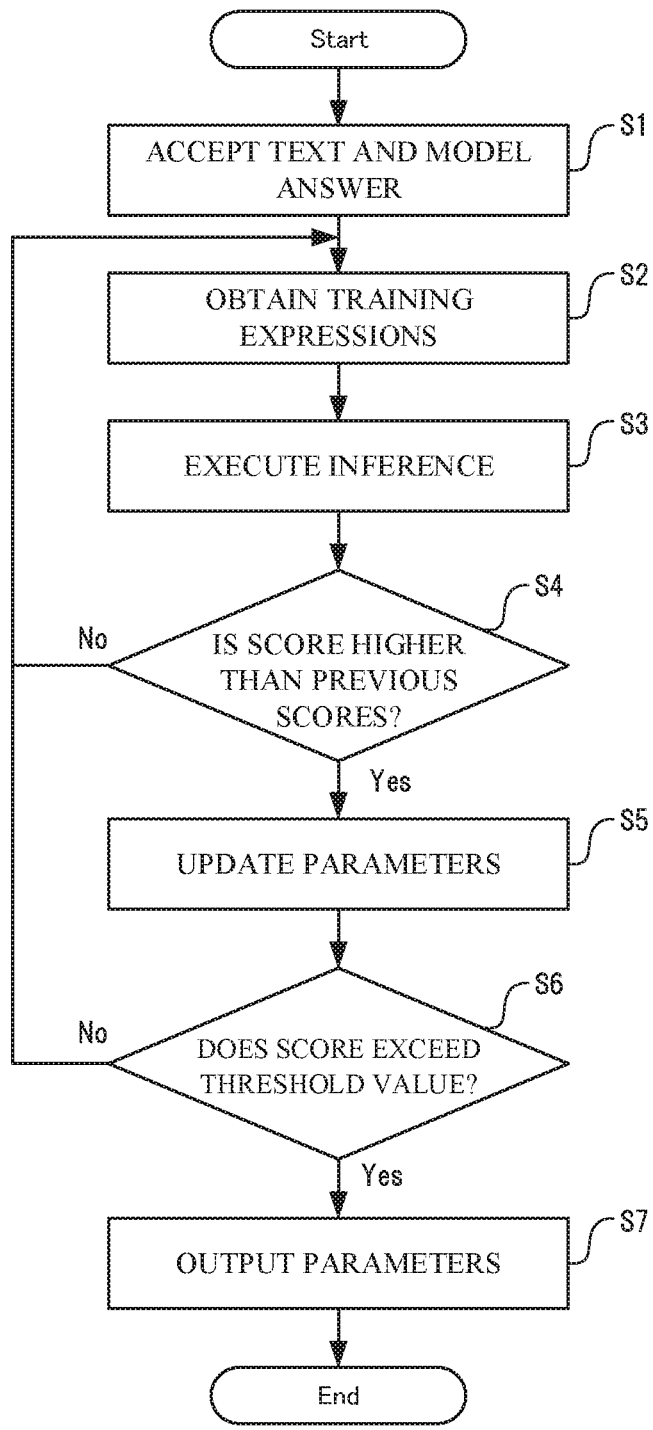
FIG. 9 is a flowchart showing operations of an information processing apparatus according to Modified Example 3 of the invention.

As shown in FIG. 9, when the inference unit 16 performs probabilistic inference, the update unit 18 determines in step S4 whether or not any one of scores calculated by the inference unit 16 for each combination of training expressions (a probability that the model answer is obtained) is higher than the highest value of scores calculated previously. If any of the scores calculated by the inference unit 16 is higher than the highest value of the scores calculated previously, the update unit 18 updates parameters such that a training expression from which the score can be obtained is likely to be generated by the formal language generation unit 14 (step S5). In other words, parameters stored in the parameter storage unit 102 are updated such that the generation probability of a training expression, based on which the inference unit 16 can obtain a score that is higher than the highest value of the scores calculated previously, is increased. Note that parameters can be updated using, for example, an algorithm disclosed in Non-patent Document 1, and thus a detailed description thereof is omitted.

In addition, in the information processing apparatus 10 according to Modified Example 3, in step S6, determination is performed as to whether or not any one of scores currently calculated by the inference unit 16 exceeds a predetermined threshold value. If it is determined in step S6 that any one of the scores calculated by the inference unit 16 exceeds the predetermined threshold value, the output unit 20 outputs parameters updated by the update unit 18 (step S7).

If it is determined in step S4 that none of the scores calculated by the inference unit 16 is higher than the highest value of the scores previously calculated, or, if it is determined in step S6 that none of the scores calculated by the inference unit 16 exceeds the threshold value, the process in step S2 is executed again, and training expressions are newly generated by the formal language generation unit 14. Subsequently, the above-described processing is repeatedly executed. Note that content of processes other than those in steps S4 and S6 is similar to that described with reference to FIG. 7, and thus a detailed description thereof is omitted.

When probabilistic inference is performed as in Modified Example 3, the value of a score calculated by the inference unit 16 increases as a result of some pieces of text out of a plurality of pieces of text being converted into a proper formal language. Therefore, even if only some pieces of text of a plurality of pieces of text (for example, several thousands of pieces of text) are converted into proper expressions in a formal language by the formal language generation unit 14, parameters stored in the parameter storage unit 102 can be updated.

Program

The program according to the example embodiment of the invention need only be a program that causes a computer to execute steps S1 to S7 shown in FIG. 7, 8, or 9. The information processing apparatus and the information processing method according to the example embodiment can be realized, by this program being installed on a computer and executed. In this case, the CPU (Central Processing Unit) of the computer, which is an information processing apparatus, performs processing, while functioning as the acceptance unit 12, the formal language generation unit 14, the inference unit 16, the update unit 18, and the output unit 20.

Also, the program according to the example embodiment may be executed by a computer system built from a plurality of computers. In this case, for example, each of the computers may function as one of the acceptance unit 12, the formal language generation unit 14, the inference unit 16, the update unit 18, and the output unit 20.

Physical Configuration

Figure 10:
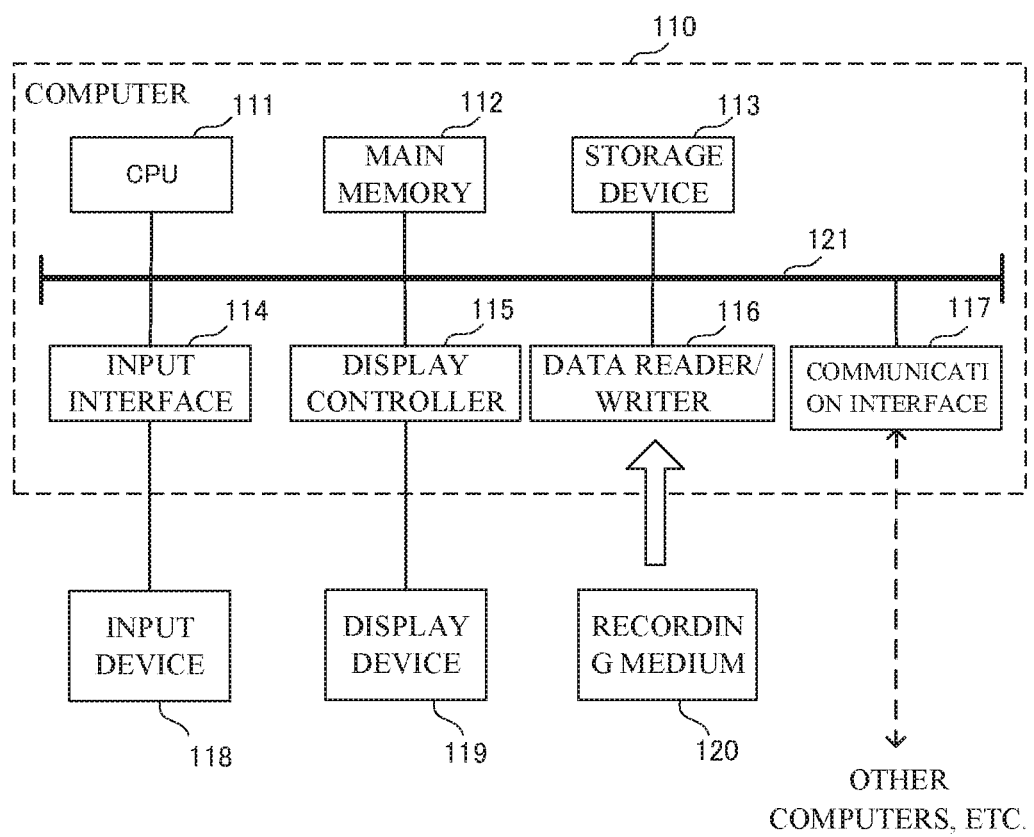
FIG. 10 is a block diagram showing an example of a computer that realizes an information processing apparatus according to an example embodiment of the invention.

Here, a computer that realizes an information processing apparatus by executing the program according to the example embodiment is described with reference to drawings. FIG. 10 is a block diagram showing an example of a computer that realizes the information processing apparatus according to the example embodiment of the invention.

As shown in FIG. 10, a computer 110 includes a CPU 111, a main memory 112, a storage device 113, an input interface 114, a display controller 115, a data reader/writer 116, and a communication interface 117. These units are connected in a manner that enables data communication therebetween, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting programs (code) according to the example embodiment that are stored in the storage device 113 in the main memory 112, and executing these programs in predetermined order. The main memory 112, typically, is a volatile storage device such as a DRAM (Dynamic Random Access Memory). Also, programs according to the example embodiment are provided in a state of being stored on a computer-readable recording medium 120. Note that programs according to the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic storage medium such as a flexible disk, and an optical storage medium such as a CD-ROM (Compact Disk Read Only Memory) are given as specific examples of the recording medium 120.

Note that the information processing apparatus according to the example embodiment is also realizable by using hardware corresponding to the respective units, rather than by a computer on which programs are installed. Furthermore, the information processing apparatus may be realized in part by programs, and the remaining portion may be realized by hardware.

The example embodiment described above can be partially or wholly realized by supplementary notes 1 to 15 described below, but the invention is not limited to the following description.

Supplementary Note 1

An information processing apparatus comprising:
an acceptance circuit configured to accept at least one of texts written in a natural language and at least one of labels written in a formal language for the texts;
a formal language generation circuit configured to generate at least one of queries written in the formal language for the texts by using a pre-trained machine learning model and the texts;
an inference circuit configured to automatically infer at least one of inference results written in the formal language by applying at least one of deductive inference method and abduction method to the queries and a knowledge base; and
an update circuit configured to update the model such that the at least one of inference results that matches the labels is likely to be obtained through the inference performed by the inference circuit.

Supplementary Note 2

The information processing apparatus according to Supplementary Note 1,
wherein the inference circuit is configured to calculate a probability that the labels is obtained from the at least one of queries by executing probabilistic inference, and
the update circuit updates the model such that the probability that is calculated by the inference circuit is increased.

Supplementary Note 3

The information processing apparatus according to Supplementary Note 1,
wherein the labels include a plurality of expressions written in a formal language, and
the update circuit is configured to update, in response to a condition that the at least one of inference results that matches at least one expression out of the plurality of expressions included in the labels is obtained through the inference performed by the inference circuit, the model such that the at least one of inference results that matches the at least one expression is likely to be obtained through the inference performed by the inference circuit.

Supplementary Note 4

The information processing apparatus according to Supplementary Note 1 or 3,
wherein the formal language generation circuit is configured to generate queries for each texts accepted by the acceptance circuit, and the inference circuit is configured to inference the at least one of inference results on the queries generated for each texts.

Supplementary Note 5

The information processing apparatus according to Supplementary Note 1, 3, or 4,
wherein the update circuit is configured to update, in response to a condition that the inference circuit obtains the at least one of inference results that matches the labels, the model such that the queries from which the queries that matches the labels is obtained is likely to be generated by the formal language generation circuit.

Supplementary Note 6

An information processing method, comprising:
(a) a step of accepting at least one of texts written in a natural language and at least one of labels written in a formal language for the texts;
(b) a step of generating at least one of queries written in the formal language for the texts by using a pre-trained machine learning model and the texts;
(c) a step of inferencing automatically at least one of inference results written in the formal language by applying at least one of deductive inference method and abduction method to the queries and a knowledge base; and
(d) a step of updating automatically the model the at least one of inference results that matches the labels is likely to be obtained through the inference in the (c) step.

Supplementary Note 7

The information processing method according to Supplementary Note 6,
wherein, in the (c) step, a probability that the labels are obtained from the at least one of queries is calculated by executing probabilistic inference, and
in the (d) step, the model is updated such that the probability that is calculated in the (c) step is increased.

Supplementary Note 8

The information processing method according to Supplementary Note 6,
wherein the labels include a plurality of expressions written in a formal language, and in the (d) step, the model is updated such that the at least one of inference results that matches the at least one expression is likely to be obtained through the inference in the (c) step, in response to a condition that the at least one of inference results that matches at least one expression out of the plurality of expressions included in the labels is obtained through the inference in the (c) step.

Supplementary Note 9

The information processing method according to Supplementary Note 6 or 8,
wherein, in the (a) step, texts in the natural language are accepted,
in the (b) step, the plurality of queries are generated for each texts accepted in the (a) step, and
in the (c) step, the at least one of inference results is inferred on the plurality of queries generated for each texts.

Supplementary note 10

The information processing method according to Supplementary Note 6, 8, or 9,
wherein, in the (d) step, the model is updated such that the queries from which the at least one of inference results that matches the labels is obtained is likely to be generated in the (b) step, in response to a condition that the at least one of inference results that matches the labels is obtained in the (c) step.

Supplementary Note 11

A computer-readable recording medium that includes a program recorded thereon, the program including instructions that cause a computer to carry out:
(a) a step of accepting at least one of texts written in a natural language and at least one of labels written in a formal language for the texts;
(b) a step of generating at least one of queries written in the formal language for the texts by using a pre-trained machine learning model and the texts;
(c) a step of automatically inferring at least one of inference results written in the formal language by applying at least one of deductive inference method and abduction method to the queries and a knowledge base; and
(d) a step of automatically updating the model such that the at least one of inference results that matches the labels is likely to be obtained through the inference in the (c) step.

Supplementary Note 12

The computer-readable recording medium according to Supplementary Note 11,
wherein, in the (c) step, a probability that the labels are obtained from the at least one of queries is calculated by executing probabilistic inference, and
in the (d) step, the model is updated such that the probability that is calculated in the (c) step is increased.

Supplementary Note 13

The computer-readable recording medium according to Supplementary Note 11,
wherein the labels include a plurality of expressions written in a formal language, and
in the (d) step, the model is updated such that the at least one of inference results that matches the at least one expression is likely to be obtained through the inference in the (c) step, in response to a condition that the at least one of inference results that matches at least one expression out of the plurality of expressions included in the labels is obtained through the inference in the (c) step.

Supplementary Note 14

The computer-readable recording medium according to Supplementary Note 11 or 13,
wherein, in the (a) step, texts in the natural language are accepted,
in the (b) step, a plurality of queries are generated for each texts accepted in the (a) step, and
in the (c) step, the at least one of inference results inferred on the plurality of queries generated for each texts.

Supplementary Note 15

The computer-readable recording medium according to Supplementary Note 11, 13, or 14, wherein, in the (d) step, the model is updated such that the queries from which the at least one of inference results that matches the labels is obtained is likely to be generated in the (b) step, in response to a condition that the at least one of inference results that matches the labels is obtained in the (c) step.

INDUSTRIAL APPLICABILITY

As described above, according to the invention, it is possible to optimize parameters that are used when a piece of text in a natural language is converted into an expression in a formal language in a system that performs inference based on a natural language input by the user.

LIST OF REFERENCE SIGNS

10 Information processing apparatus
12 Acceptance unit
14 Formal language generation unit
16 Inference unit
18 Update unit
20 Output unit
102 Parameter storage unit
104 Knowledge base storage unit
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. An information processing apparatus comprising:
one or more memories storing instructions; and
one or more processors configured to execute the instructions to:
   accept at least one of texts written in a natural language and at least one of labels written in a formal language for the texts;
   transfer the at least one of words in the texts into another word corresponding to the at least one of words based on a pre-determined feature table, the feature table defining a weight of each relationship between the at least one of words in the texts and the another word;
   generate at least one of queries written in the formal language for the texts by using a pre-trained machine learning model and the texts, wherein input data of the pre-trained machine learning model comprises the another word;
   automatically infer at least one of inference results written in the formal language by applying at least one of deductive inference method and abduction method to the queries and a knowledge base; and
   update the weight such that the at least one of inference results that matches the labels is likely to be obtained through the inference performed.

2. The information processing apparatus according to claim 1,
   wherein the one or more processors are configured to calculate a probability that the labels are obtained from the at least one of queries by executing probabilistic inference, and
   the one or more processors are configured to update the model such that the probability that is calculated is increased.

3. The information processing apparatus according to claim 1,
   wherein the labels include a plurality of expressions written in a formal language, and
   the one or more processors are configured to update, in response to a condition that the at least one of inference results that matches at least one expression out of the plurality of expressions included in the labels is obtained through the inference, the model such that the at least one of inference results that matches the at least one expression is likely to be obtained through the inference .

4. The information processing apparatus according to claim 1,
   wherein the one or more processors are configured to generate queries for each texts accepted, and
   the one or more processors are configured to inference the at least one of inference results on the queries generated for each texts.

5. The information processing apparatus according to claim 1,
   wherein the one or more processors are configured to update, in response to a condition that the at least one of inference results that matches the labels is obtained, the model such that the queries from which the queries from which the labels are obtained is likely to be generated.

6. The information processing apparatus according to claim 1,
   wherein the one or more processors are is configured to update the model using machine learning.

7. An information processing method comprising:
   accepting at least one of texts written in a natural language and at least one of labels written in a formal language for the texts;
   transferring the at least one of words in the texts into another word corresponding to the at least one of words based on a pre-determined feature table, the feature table defining a weight of each relationship between the at least one of words in the texts and the another word;
   generating at least one of queries written in the formal language for the texts by using a pre-trained machine learning model and the texts, wherein input data of the pre-trained machine learning model comprises the another word;
   automatically inferring at least one of inference results written in the formal language by applying at least one of deductive inference method and abduction method to the queries and a knowledge base; and
   automatically updating the weight such that the at least one of inference results that matches the labels is likely to be obtained through the automatically inferring.

8. The information processing method according to claim 7,
   wherein, when the at least one of inference results is inferred, a probability that the labels are obtained from the at least one of queries is calculated by executing probabilistic inference, and when the model is updated, the model is updated such that the probability is increased.

9. The information processing method according to claim 7,
wherein the labels include a plurality of expressions written in a formal language, and
when the model is updated, the model is updated such that the at least one of inference results that matches the at least one expression is likely to be obtained through the automatically inferring, in response to a condition that the at least one of inference results that matches at least one expression out of the plurality of expressions included in the labels is obtained through the automatically inferring.

10. The information processing method according to claim 7,
wherein texts in the natural language are accepted,
when a plurality of queries are generated, the plurality of queries are generated for each texts, and
when the at least one of inference results is inferred, the at least one of inference results is inferred on the plurality of queries generated for each texts.

11. The information processing method according to claim 7,
wherein, when the model is updated, the model is updated such that the queries from which the at least one of inference results that matches the labels is obtained is likely to be generated, in response to a condition that the at least one of inference results that matches the labels is obtained.

12. The information processing method according to claim 7,
wherein when the model is automatically updated, the model is updated using machine learning.

13. A non-transitory computer-readable recording medium that includes a program recorded thereon, the program including instructions that cause a computer to carry out:
accepting at least one of texts written in a natural language and at least one of labels written in a formal language for the texts;
transferring the at least one of words in the texts into another word corresponding to the at least one of words based on a pre-determined feature table, the feature table defining a weight of each relationship between the at least one of words in the texts and the another word;
generating at least one of queries written in the formal language for the texts by using a pre-trained machine learning model and the texts, wherein input data of the pre-trained machine learning model comprises the another word;

automatically inferring at least one of inference results written in the formal language by applying at least one of deductive inference method and abduction method to the queries and a knowledge base; and
automatically updating the model such that the at least one of inference results that matches the labels is likely to be obtained through the automatically inferring.

14. The non-transitory computer-readable recording medium according to claim 13,
wherein, when the at least one of inference results is inferred, a probability that the labels are obtained from the at least one of queries is calculated by executing probabilistic inference, and
when the model is updated, the model is updated such that the probability is increased.

15. The non-transitory computer-readable recording medium according to claim 13,
wherein the labels include a plurality of expressions written in a formal language, and
when the model is updated, the model is updated such that the at least one of inference results that matches the at least one expression is likely to be obtained through the automatically inferring, in response to a condition that the at least one of inference results that matches at least one expression out of the plurality of expressions included in the labels is obtained through the automatically inferring.

16. The non-transitory computer-readable recording medium according to claim 13,
wherein texts in the natural language are accepted,
when a plurality of queries are generated, a the plurality of queries are generated for each texts, and
when the at least one of inference results is inferred, the at least one of inference results is inferred on the plurality of queries generated for each texts.

17. The non-transitory computer-readable recording medium according to claim 13,
wherein, when the model is updated, the model is updated such that the queries from which the at least one of inference results that matches the labels is obtained is likely to be generated, in response to a condition that the at least one of inference results that matches the labels is obtained.

18. The non-transitory computer-readable recording medium according to claim 13,
wherein when the model is automatically updated, the model is updated using machine learning.

* * * * *